United States Patent [19]

Bode et al.

[11] Patent Number: 5,418,292

[45] Date of Patent: May 23, 1995

[54] THERMOSETTING ACID FUNCTIONAL CRYSTALLINE POLYESTER MODIFIED ACRYLIC COATINGS

[75] Inventors: Daniel Bode, Cleveland; Perry A. Toman, Medina; Henry J. DeGraaf, Stow; Susan M. Miller, North Royalton, all of Ohio

[73] Assignee: Ferro Corporation, Cleveland, Ohio

[21] Appl. No.: 158,655

[22] Filed: Nov. 29, 1993

Related U.S. Application Data

[63] Continuation of Ser. No. 880,153, May 5, 1992, abandoned.

[51] Int. Cl.⁶ .............................................. C08L 37/00
[52] U.S. Cl. ................................. 525/131; 525/167; 525/176; 525/934
[58] Field of Search ................ 525/131, 167, 176, 934

[56] References Cited

U.S. PATENT DOCUMENTS

| | | | |
|---|---|---|---|
| 2,857,354 | 10/1958 | Fang | 260/33.2 |
| 3,781,380 | 12/1973 | Labana | 260/836 |
| 3,857,905 | 12/1974 | Blackley | 525/166 |
| 4,499,239 | 2/1985 | Murakami | 525/111 |
| 4,937,228 | 6/1990 | Takahashi | 505/1 |
| 4,937,288 | 6/1990 | Pettit | 525/176 |

FOREIGN PATENT DOCUMENTS 1391863  4/1975  United Kingdom .

Primary Examiner—Patricia A. Short
Attorney, Agent, or Firm—Rankin, Hill, Lewis & Clark

[57] ABSTRACT

Clear and pigmented powder paint coatings are based on a thermosetting polymeric binder comprising low molecular weight, carboxylic acid functional, crystalline polyester and a coreactive glycidyl functional addition copolymer, preferably and glycidyl functional acrylic copolymer.

6 Claims, No Drawings

THERMOSETTING ACID FUNCTIONAL CRYSTALLINE POLYESTER MODIFIED ACRYLIC COATINGS

This is a divisional of application Ser. No. 07/880,153, filed on May 5, 1992, now abandoned.

This invention pertains to paint coatings and particularly to clear and pigmented powder paint coatings based on a thermosetting polymeric binder comprising a carboxylic acid functional crystalline polyester and coreactive functional acrylic copolymers.

BACKGROUND OF THE INVENTION

This invention pertains to protective surface coatings commonly known as paint coatings. Protective surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other paint coating additives. The polymeric binder functions as an organic vehicle for the pigments, inerts, and other additives and further functions as a binder for the pigments and inert fillers in the cured or hardened paint film. Polymeric binders can be thermosetting binders based on coreactive binder components. Conventional thermosetting polymers often require high temperatures as well as external crosslinkers. Some crosslinkers, such as melamines in conventional industrial coatings or triglycidyl isocyanurate for powder coatings, can cause toxicity problems. The release of volatile by-products, such as caprolactam, from some of these materials can cause film defects, such as cratering and bubbling.

Powder coatings are organic powder coating which are dry, and essentially 100% non-volatile solids based on a polymeric film forming binder. Powder coatings can be clear coatings without opacifying pigments or pigmented coatings containing opacifying pigments. Protective surface coatings based on powder paints are particularly useful in view of environmental compliance in that powder paints do not contain organic solvents or emit organic compounds upon baking or heat curing. Powder paints are finely pulverized polymeric compositions in the form of dry free-flowing fine powder which melts and flows at elevated temperatures to produce a smooth coated surface when applied to a substrate.

Thermosetting acrylic polymer based powder coatings exhibit good exterior durability as well as detergent and alkali resistance. Acrylic powders exhibit good surface hardness and scratch resistance but generally are less flexible than polyester powder coatings. Functionally reactive acrylic copolymers can be cured or cross-linked with crosslinkers such as aliphatic diacids to obtain good film appearance. When a diacid crosslinker is used, the diacid has a melting point below the curing temperature required for the coating. However, the chain length of the diacid has been found to have a profound effect on coating appearance. If the chain length is too short, a low level of plasticizing crosslinker is required, resulting in poor film appearance. If the chain length is too long, compatibility with the polar acrylic resin is poor and problems such as hazing in the film can occur. The use of glycidyl functional acrylic copolymers cured with diacid crosslinkers in a liquid paint system is described in U.S. Pat. No. 2,857,354. In U.S. Pat. No. 3,781,380, use of these materials is described for powder coatings although the crosslinkers are aliphatic diacid compounds. U.S. Pat. No. 4,937,288 describes the use of acid functional polyesters in conjunction with glycidyl acrylic polymers, where the polyesters described are amorphous.

It now has been found that coating compositions containing a new type of crystalline polyester crosslinker comprising the reaction product of an aliphatic dicarboxylic acid and preferred aliphatic diols results in good cured film appearance and good physical properties. Useful crystalline polyester crosslinkers can include a dicarboxylic acid polyester-urethane crosslinker. It has been found that glycidyl functional acrylic powder coating formulations can be crosslinked with the crystalline polyester crosslinker to give films that possess good appearance and mechanical properties. These powder coatings exhibit good physical and chemical stability, and provide cured films with good appearance exhibiting improved physical properties and exterior durability. These and other advantages of the invention will become more apparent by referring to the detailed description of the invention along with the illustrated examples.

SUMMARY OF THE INVENTION

Briefly, the invention pertains to protective surface coatings containing a thermosetting polymeric binder comprising by weight between about 60% and 95% of a glycidyl functional acrylic copolymer and between 5% and 40% of a coreactive crystalline, carboxyl functional polyester crosslinker including a polyester-urethane crosslinker. The coating composition can be clear or pigmented and the preferred coatings are powder coatings.

DETAILED DESCRIPTION OF THE INVENTION

The invention is based on thermosetting polymeric compositions comprising a glycidyl acrylic copolymer and a coreactive crystalline, carboxyl functional polyester.

The glycidyl functional acrylic copolymer comprises non-aqueous addition copolymerized ethylenically unsaturated monomers including copolymerized glycidyl acrylate or methacrylate monomers. Glycidyl monomers are oxirane functional monomers containing pendant ethylenic double bond unsaturation and include for example, acrylic, methacrylic, or vinyl derivatives of glycidol. Preferred oxirane monomers contain pendant oxirane and include glycidyl acrylate, glycidyl methacrylate, and allyl glycidyl ether. The oxirane monomers can be copolymerized in the absence of water with other ethylenically unsaturated monomers. Polymerizable ethylenically unsaturated monomers contain carbon-to-carbon unsaturation and include vinyl monomers, acrylic monomers, allylic monomers, and acrylamide monomers. The most preferred ethylenic monomers are acrylic monomers including monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates and methacrylates, such as acid, ethacrylic acid, acrylic and methacrylic alpha-chloroacrylic acid, alpha-cycanoacrylic acid, crotonic acid, beta-acryloxy propionic acid, and beta-styrl acrylic acid, hydroxy containing ethylenically unsaturated monomers include hydroxy alkyl acrylates such as 2-hydroxy ethyl acrylate and methacrylate, 2-hydroxypropyl acrylate and methacrylate, and similar hydroxy alkyl acrylates, and amido containing monomers including acrylamide and methacrylamide or similar alkyl alkylol acrylamide monomers.

Other useful ethylenic monomers can include vinyl monomers including vinyl esters such as vinyl acetate, vinyl propionate, vinyl butyrates, vinyl benzoates, vinyl isopropyl acetates and similar vinyl esters; vinyl aromatic hydrocarbons such as styrene, methyl styrenes and similar lower alkyl styrenes, chlorostyrene, vinyl toluene, vinyl naphthalene, divinyl benzene, vinyl aliphatic hydrocarbon monomers such as alpha olefins such as ethylene, propylene, isobutylene, and cyclohex as well as conjugated dienes such as 1,3-butadiene, methyl-2-butadiene, 1,3-piperylene, 2,3 dimethyl butadiene, isoprene, cyclohexane, cyclopentadiene, and dicyclopentadiene; and vinyl alkyl ethers include methyl vinyl ether, isopropyl vinyl ether, n-butyl vinyl ether, and isobutyl vinyl ether.

On a weight basis, the glycidyl functional acrylic copolymer comprises between 10% and 50% glycidyl monomer, between 30% and 90% acrylic monomer, with the balance being other ethylenic monomers. Preferred glycidyl acrylic copolymer comprise copolymerized ethylenic monomers between 15% and 30% glycidyl monomer, between 40% and 80% acrylic monomer, with the balance being other ethylenic monomers. The glycidyl acrylic copolymer preferably has a softening point (Tg) within the range of about 35° C. and 100° C. and number average molecular weight between about 1,000 and 20,000 and preferably between 1,500 and 7,000. Number average molecular weights are typically measured by GPC according to ASTM D3536-76, D3593-80, or D3016-78. Tg can be calculated by the Fox equation based on the ratio of specific monomers or measured by ASTM 3418-75.

The glycidyl functional acrylic polymer can be produced by bulk or solvent addition polymerization of ethylenically unsaturated monomers activated by peroxide or azo or other free radical initiator at polymerization temperatures typically between 70° C. to 170° C. and preferably between 120° C. to 150° C. Typically 0.5 to 5% initiator is utilized based on the weight of the monomers. Typical polymerization initiators can include for instance, benzoyl peroxide, t-butyl hydroperoxide, tertiary butyl perbenzoate, cumene peroxide and similar peroxide polymerization initiators; azo initiators such as azo bisisobutyronitrile and dimethylazobisisobutyrate are preferred; alkali metal persulfate or ammonium persulfates can be used as well. Mercaptans can be added to provide copolymers of low molecular weight. Mercaptans useful in controlling molecular weight and primarily to produce low molecular weight polymers include for example, 2-mercaptoethanol; 1-mercapto-2-propanol; and 2-hydroxyethyl-3-mercapto propionate. Mercaptans are added at levels about 4% based on monomer solids and broadly between about 0.5% and 6%. Preferably the monomers containing mercaptans are completely copolymerized before concluding the copolymerization of all monomers to preclude free levels of mercaptans in the polymer. However, mercaptans may not be as effective in the higher temperature ranges due to a competing reaction—addition of the mercaptan to the glycidyl group, rendering both moieties ineffective for their intended use.

Referring next to the carboxyl functional crystalline polyester crosslinker, the crystalline polyester comprises a low molecular weight reaction product of symmetrical reactants comprising a hydroxyl component and dicarboxylic acid to produce a crystalline polyester polymer having an ordered linear structure and terminal carboxyl groups. Preferred hydroxyl reactants are linear diol comprising symmetrical glycols having an even number of carbon atoms containing terminal, primary hydroxyl groups attached to each terminal carbon atom, where preferred symmetrical glycols are the linear aliphatic chain glycols. Useful symmetrical glycols include for instance 1,4-butylene glycol, 1,6-hexane diol, neopentyl glycol, 1,4-cyclohexanedimethanol, and ethylene glycol. Preferred symmetrical glycols are ethylene glycol and 1,6-hexane diol. Symmetrical dicarboxylic acids similarly comprise symmetrical aliphatic structures having terminal carboxylic acid groups. Useful aliphatic dicarboxylic acids consist of linear aliphatic structures having 2 to 20 carbon atoms and having an even number of carbon atoms. Useful symmetrical aliphatic dicarboxylic acids include oxalic, succinic, adipic, suberic, sebacic, dodecanedioic and similar unbranched, even number carbon atom dicarboxylic acids. The preferred crystalline, carboxyl functional polyester comprises a crystalline carboxyl functional mixture produced by reacting excess equivalents of crystalline dicarboxylic acid with lesser equivalents of dihydroxy reactant to produce a reaction product comprising unreacted dicarboxylic acid and low molecular weight, carboxyl terminated crystalline polyester. To obtain the carboxyl functional polyester, lesser equivalents of symmetrical glycol are esterified with considerable excess equivalents of dicarboxylic acid to produce a low melt point, linear, structured crystalline polyester having an Acid No. between about 200 and 400 and a number average molecular weight between 250 and 1,000. The preferred crystalline polyester has a number average molecular weight between 250 and 500 and a melt point above about 70° C.

The crystalline crosslinker preferably contains by weight at least about 45% free unreacted dicarboxylic acid and preferably at least 85% of unreacted dicarboxylic acid and carboxyl functional, oligomeric crystalline polyester containing five or less reactive units. For instance, two dihydroxy units reacted with three dicarboxylic acid units produces a five unit, carboxyl terminated, low molecular weight, symmetrical crystalline oligomeric polyester. It has been found that the mixture of unreacted dicarboxylic and carboxyl functional crystalline polyester oligomers provide an excellent crosslinker particularly exhibiting a sharp melting point which is particularly advantageous for powder paint. The polyester dicarboxylic acid crosslinking agents are prepared by the condensation of a dicarboxylic acid, preferably containing an even number of carbon atoms, with a suitable symmetrical dihydroxy material. The equivalent ratio of dicarboxylic acid to dihydroxy material is from 2:1 to 10:1 and preferably between about 3:1 and 6:1. A preferred composition is the mixture formed from the reaction of dodecanedioic acid and ethylene glycol with a molar ratio of between about 3:1 and 5:1 and most preferably about 4:1.

In accordance with a further embodiment of this invention, glycidyl functional acrylic polymers can be crosslinked by a carboxyl functional crystalline polyester comprising a crystalline polyester-urethane to produce improved thermoset powder coating films. The crystalline polyester-urethane comprises a mixture of reaction products produced by reacting excess equivalents of aliphatic symmetrical diacid with lesser equivalents of aliphatic symmetrical hydroxy urethane diol to produce a crystalline polyester-urethane having terminal carboxyl groups. Crystallinity is achieved by reacting symmetrical dicarboxylic acid components with symmetrical urethane diols to produce an ordered, essentially symmetrical, linear crystalline polyester-urethane. Useful aliphatic dicarboxylic acids consist of linear aliphatic structures having 2 to 20 carbon atoms and having an even number of carbon atoms. Useful symmetrical aliphatic dicarboxylic acids include oxalic, succinic, adipic, suberic, sebacic, dodecanedioic and similar unbranched, even number carbon atom dicarboxylic acids. Similarly, useful urethane diols are linear symmetrical aliphatic-urethane structures having an intermediate urethane linkage symmetrically linked with linear aliphatic chains having an even number of carbon atoms where each aliphatic chain is terminated with a primary hydroxyl group to provide the symmetrical diol structure. Preferred symmetrical urethane diols can be produced by reacting an even number carbon atom, lower alkanol amine, such as ethanol diamine, with ethylene carbonate to produce the symmetrical urethane diol.

The preferred crystalline, carboxyl functional polyester-urethane crosslinker comprises a crystalline carboxyl functional mixture produced by reacting excess equivalents of crystalline dicarboxylic acid with lesser equivalents of dihydroxy urethane reactant to produce a reaction product comprising unreacted dicarboxylic acid and low molecular weight, carboxyl terminated crystalline polyester-urethane oligomer. To obtain the carboxyl functional polyester-urethane crosslinker, lesser equivalents of symmetrical urethane diol are esterified with considerable excess equivalents of dicarboxylic acid to produce a low melt point, linear structured crystalline polyester-urethane oligomer having an Acid No. between about 200 and 400 and a number average molecular weight between 250 and 1,000. The preferred crystalline polyester-urethane oligomer has a number average molecular weight between 250 and 500 and a melt point above about 70° C. The crystalline polyester-urethane crosslinker preferably comprises a mixture containing at least about 45% by weight free unreacted dicarboxylic acid and at least 85% by weight of unreacted dicarboxylic acid plus dicarboxylic acid functional crystalline polyester-urethane oligomer containing five or less coreactive units in chain length. The polyester-urethane units are intentionally limited in the molecular length to 5 molecules whereby the crosslinker will exhibit a sharp melting point. For instance, two dihydroxy-urethane units reacted with three dicarboxylic acid units produces a five unit, carboxyl terminated, low molecular weight, oligomeric polyester-urethane. It has been found that the mixture of unreacted dicarboxylic and carboxyl functional polyester-urethane oligomers provide an excellent crosslinker particularly exhibiting a sharp melting point which is particularly advantageous for powder paint.

The polyester-urethane crosslinker are prepared by the condensation reaction of a symmetrical dicarboxylic acid containing an even number of carbon atoms with a suitable symmetrical dihydroxy urethane material. The useful equivalent ratio of dicarboxylic acid to dihydroxy-urethane material is from 2:1 to 10:1 and preferably between about 3:1 and 6:1. A preferred composition is the mixture formed from the reaction of dodecanedioic acid and 2-hydroxyethyl urethane of ethanol with an equivalent ratio of between about 3:1 and 5:1 and most preferably about 4:1.

In a similar manner, a crystalline polyester-urethane containing functionally reactive carboxyl groups adapted to coreact with glycidyl functional acrylic polymers can be produced by coreacting a symmetrical aliphatic diamine having an even number of carbon atoms from 2 to 10 carbons, such as hexane diamine, with ethylene carbonate to produce an aliphatic symmetrical urethane intermediate linear structure containing a terminal primary amine group and a terminal primary hydroxyl group. The hydroxyl and amine functional urethane intermediate is then be reacted with considerably excess equivalents of dicarboxylic acid to produce a crystalline carboxyl functional crosslinker. On an equivalent basis, the useful equivalent ratio of dicarboxylic acid reacted with urethane intermediate can range between about 2:1 and 10:1, desirably between 3:1 and 6:1, and most preferably around 4:1.

It has been found that glycidyl functional acrylic polymers adapted to be cured and crosslinked with low molecular weight, dicarboxylic acid functional, crystalline polyester crosslinkers provide excellent thermoset powder coatings. To obtain a good cured paint film including good appearance and good mechanical properties, the melting point of the crystalline crosslinker is above about 70° C., preferably above about 80° C., but below the curing temperature required for crosslinking the coating. The chain length of the oligomer crystalline crosslinker formed is predominantly around five or less coreactive units in conjunction with at least about 45% by weight non-oligomer, unreacted, dicarboxylic acid. If the oligomer chain length is too long, compatibility with the polar acrylic resin becomes a problem resulting in hazy cured paint films.

Dry powder paints can be produced as unpigmented clear powders or pigmented powders. The polymeric binder comprising glycidyl acrylic and dicarboxylic acid crosslinker resins can be blended together with other paint additives including filler and colorant pigments if desired. The resinous binder can be thoroughly and uniformly mixed with raw batch ingredients by homogenizing the binders, pigmentary solids, plasticizers and other components to uniformly blend the resinous binder with the pigmentary solids. Powder paint can contain additives such as U.V. absorbers, light stabilizers and flow control additives. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder wherein the extruder is internally heated by an indirect heating fluid such as steam, hot water, or synthetic oil whereupon the exit extruder temperature is regulated according to the type of powder paint being produced but generally is between about 40° C. and 150° C. at the heated exit die of the screw fed extruder. The extrudate emerges from the extruder as a ribbon of less than about 1/16 inch thickness which passes onto a water cooled stainless steel conveyor belt whereby the plastic ribbon extrudate fully hardens. The cooled extrudate then passes through a mechanical commuter disposed at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The present invention describes the use of crystalline diacid polyester-urethane crosslinkers in glycidyl functional acrylic powder coating compositions. The crosslinker contains greater than 45% free unreacted diacid and at least 85% of the material is less than or equal to 5 coreactive units in chain length whereby the number of molecular species is limited and the crystalline crosslinker exhibits a sharp melting point. Crystalline polyester. crosslinkers characteristically exhibit a high degree of structural regularity and crystal packing where even number of carbon atom reactants promote regularity and crystal packing. Thus, the symmetrical linear polyester crosslinkers of this invention are crystalline. The thermoset coating compositions are prepared by melt mixing the ingredients of the coating which can be accomplished by dry blending in a Wellex mixer, followed by melt mixing in an extruder at a temperature of 30° C. to 130° C. The extrudate is cooled and ground into a fine powder. The powder coating is then applied to a metal substrate by electrostatic spray or fluidized bed. Upon application of the powder, the coated substrate is baked at a temperature of 275°–350° F. (120° C. to 200° C.) for 30 to 45 minutes. These powder coatings have good physical and chemical stability and, when cured, give films with good appearance, physical properties, and exterior durability.

The present invention will be more fully understood by referring to the following illustrative examples.

EXAMPLE 1

Preparation of Crystalline Crosslinker #1

47.3 grams of ethylene glycol were charged to a standard 4 neck reaction vessel fitted with an agitator, packed column and a thermometer. The glycol was heated to 115° C., and 702.7 grams of dodecanedioic acid added. The solution was heated slowly to 240° C., with water being removed continuously, over a 4 hour period. The reaction product was then cooled and poured out. The final product had a melting point of 102° C. to 104.5° C. and the following calculated composition:

| | |
|---|---|
| Unreacted dodecanedioic acid | 75.4% |
| 2 Dodecanedioic acid/1 ethylene glycol | 18.4% |
| 3 Dodecanedioic acid/2 ethylene glycol | 4.1% |

EXAMPLE 2

Preparation of Crystalline Crosslinker #2

57.7 grams of ethylene glycol were charged to a standard 4 neck reaction vessel fitted with an agitator, packed column and a thermometer. The glycol was heated to 120° C., and 642.3 grams of dodecanedioic acid added. The solution was heated slowly to 240° C., with water being removed continuously, over a 3-1/2 hour period. The reaction product was then cooled and poured out. The final product had a melting point of 97° C. to 99° C. and the following calculated composition:

| | |
|---|---|
| Unreacted dodecanedioic acid | 68.3% |
| 2 Dodecanedioic acid/1 Ethylene Glycol | 20.7% |
| 3 Dodecanedioic acid/2 Ethylene Glycol | 7.0% |

EXAMPLE 3

Preparation of Crystalline Crosslinker #3

83 grams of ethylene glycol were charged to a standard 4 neck reaction vessel fitted with an agitator, packed column and a thermometer. The glycol was heated to 150° C., and grams of dodecanedioic acid added. The solution was heated slowly to 240° C., with water being removed continuously, over a hour period. The reaction product was then cooled and poured out. The final product had a melting point of 81° C. to 83° C. and the following calculated composition:

| | |
|---|---|
| Unreacted dodecanedioic acid | 48.4% |
| 2 Dodecanedioic acid/1 Ethylene Glycol | 27.4% |
| 3 Dodecanedioic acid/2 Ethylene Glycol | 11.4% |

EXAMPLE 4

Preparation of a Standard Prior Art Acrylic Coating

| | Weight (Grams) |
|---|---|
| Acrylic Polymer[1] | 3521.0 |
| Dodecanedioic acid | 724.2 |
| Benzoin | 21.2 |
| Triphenyl tin hydroxide | 42.5 |

[1]The acrylic polymer contains 30% by weight copolymerized glycidyl methacrylate and has a Tg of 60° C.

The resulting powder was electrostatically sprayed onto grounded steel panels. The coated panels were baked at ° F for 45 minutes to form hard glossy coatings. The coating exhibited a large amount of orange peel texture.

EXAMPLE 5

Preparation of Acrylic Coating Containing Crosslinker #1

| | Weight (Grams) |
|---|---|
| Acrylic Polymer[1] | 1105.5 |

-continued

|  | Weight (Grams) |
| --- | --- |
| Crosslinker from Example #1 | 309.6 |
| Benzoin | 7.1 |
| Triphenyl tin hydroxide | 14.2 |

[1] The acrylic polymer contains 30% glycidyl methacrylate by weight and has a Tg of 60° C.

The resulting powder was electrostatically sprayed onto grounded steel panels. The coated panels were baked at 275° F. for 45 minutes to form hard glossy coatings. The coatings did not have significant orange peel texture.

EXAMPLE 6

Preparation of Acrylic Coating Containing Crosslinker #2

|  | Weight (grams) |
| --- | --- |
| Acrylic polymer[1] | 1175.3 |
| Crosslinker from example #2 | 339.8 |
| Benzoin | 7.1 |
| Triphenyl tin hydroxide | 14.2 |

[1] The acrylic polymer contains 30% glycidyl methacrylate by weight and has a Tg of 60° C.

The resulting powder was electrostatically sprayed onto grounded steel panels. The coated panels were baked at 275° F. for 45 minutes to form hard glossy coatings. The coating exhibited only a very small amount of orange peel texture.

EXAMPLE 7

Preparation of Acrylic Coating Containing Crosslinker #3

|  | Weight (grams) |
| --- | --- |
| Acrylic polymer[1] | 994.1 |
| Crosslinker from example #3 | 421.0 |
| Benzoin | 7.1 |
| Triphenyl tin hydroxide | 14.2 |

[1] The acrylic polymer contains 30% glycidyl methacrylate by weight and has a Tg of 60° C.

The resulting powder was electrostatically sprayed onto grounded steel panels. The coated panels were baked at 275° F. for 45 minutes to form hard glossy coatings. The coating exhibited only a very minor amount of orange peel texture.

EXAMPLE 8

A. A dicarboxylic acid crosslinker was synthesized as follows:

| Component | Weight Parts |
| --- | --- |
| Ethylene glycol | 3.92 pounds |
| Dodecanedioic acid | 58.26 pounds |

Ethylene glycol was charged to a reactor fitted with a packed column, agitator, heat, and inert gas sparge and heated to 250° F. with agitation. At 250° F., the diacid was added as fast as possible without causing lumping or allowing batch temperature to drop below 250° F. Maximum temperature should not exceed 275° F., during this stage. After all the diacid was in, the batch was upheated to 350° F. During upheat water formed, was removed, (reflux will start at approximately 310° F.), but the column head temperature did not exceed 212° F. After batch temperature reached 350° F., this temperature was held until the heat temperature dropped below 180° F. After heat temperature dropped, the batch was heated to 445° F. and held at 445° F. When head temperature dropped below 180° F., a by-pass was used, and held until no more distillate was collected. Batch was cooled to 320-350° F., then poured into unlined kits for storage and further use. The crosslinker used with coreactive acrylic copolymer provided excellent thermoset coatings.

EXAMPLE 9

A crystalline crosslinker was prepared as follows. 90.3 grams of 1,6 hexanediol was charged to a standard 4 neck reaction vessel fitted with an agitator, packed column and thermometer. The glycol was heated to 120° C. and 659.7 grams of dodecanedioic acid was added. The solution was heated to 240° C., with water being removed continuously, over a 1-1/2 hour period. The reaction product was then cooled and poured out. The final product had a melting point of 98° C.–99° C.

EXAMPLE 10

A crystalline crosslinker was prepared as follows. 230.3 grams of 1,6 hexanediol was charged to a standard 4 neck reaction vessel fitted with an agitator, packed column and thermometer. The glycol was heated to 120° C. and 2019.7 grams of dodecanedioic acid was added. The solution was heated to 240° C., with water being removed continuously, over a 2½ hour period. The reaction product was then cooled and poured out. The final product had a melting point of 107° C.–110° C.

EXAMPLE 11

A crystalline crosslinker was prepared as follows. 73.3 grams of ethylene glycol was charged to a standard 4 neck reaction vessel fitted with an agitator, packed column and thermometer. The glycol was heated to 105° C. and 626.7 grams of sebacic acid was added. The solution was heated to 240° C., with water being removed continuously, over a 2½ hour period. The reaction product was then cooled and poured out. The final product had a melting point of 113° C.–120° C.

EXAMPLE 12–14

Coatings were produced using the crystalline polyester crosslinkers synthesized in Examples 9, 10, and 11 by mixing with acrylic copolymer containing 25% by weight copolymerized GMA and having a Tg of 60° C. Each test coating contained the following raw materials in the coating formulation.

| Raw material | Wt. parts |
| --- | --- |
| Benzoin | 7.1 gms. |
| Triphenyl tin hydroxide | 14.2 gms. |

| Example | Crosslinker | Acrylic Copolymer |
| --- | --- | --- |
| 12 | 316.6 gms. Ex. 9 | 1098.5 gms. |
| 13 | 298.9 gms. Ex. 10 | 1116.2 gms. |

| Example | Crosslinker | Acrylic Copolymer |
|---|---|---|
| 14 | 298.9 gms. Ex. 11 | 1116.2 gms. |

The powder coatings were applied to primed steel test panels, baked at about 275° F. for about 45 minutes to form hard glossy coatings essentially free of orange peel texture.

The following examples illustrate a polyester-urethane crystalline crosslinker.

EXAMPLE 15

Preparation of Crystalline Polyester-Urethane Crosslinker #1

40.6 grams of ethanolamine were charged to a standard neck reaction vessel fitted with an agitator, packed column and a thermometer. 70.3 grams of ethylene carbonate was added, and the temperature was allowed to rise to 100° C. The mixture was then held at 100° C. for 2 hours. The crude 2-hydroxyethyl urethane of ethanol formed had a viscosity of 4.5 poise at 30° C. (as measured by an ICI cone and plate viscometer) and a base number of 3.0. The residual base number corresponded to a conversion of amine to urethane of 99.4%. The mixture was heated to 150° C. and 689.1 grams of dodecanedioic acid were added. The solution was heated slowly to 220° C., with water being removed continuously, over a 1.5 hour period. The reaction product was then cooled and poured out. The final product had a melting point of 81° C. to 84° C.

EXAMPLE 16

Preparation of Crystalline Polyester-Urethane Crosslinker #2

59.0 grams of 1,6-hexanediamine were charged to a standard 4 neck reaction vessel fitted with an agitator, packed column and a thermometer. The amine was heated to 40° C., and 98.3 grams of ethylene carbonate were added. The solution was heated to 100° C. and held one hour. 642.8 grams of dodecanedioic acid were then added and the mixture heated slowly to 220° C. with water being removed continuously, over a 3 hour period. The reaction product was then cooled and poured out. The final product had a melting point of 88° C. to 89° C.

EXAMPLE 17

Preparation of Crystalline Polyester-Urethane Crosslinker #3

72.9 grams of 1,6 hexanediamine were charged to a standard 4 neck reaction vessel fitted with an agitator, packed column and a thermometer. The amine was heated to 40° C., and 121.5 grams of ethylene carbonate added. The solution was heated to 100° C. and held one hour. 505.6 grams of dodecanedioic acid were then added and the mixture heated slowly to 220° C. with water being removed continuously, over a 3 hour period. The reaction product was then cooled and poured out. The final product had a melting point of 73° C. to 76° C. When the crosslinker was mixed with an equal amount of dodecanedioic acid, the melting point was 95° C.-98° C.

EXAMPLE 18

Preparation of Prior Art Acrylic Powder Coating

|  | Weight (grams) |
|---|---|
| Acrylic polymer[1] | 4752.8 |
| Dodecanedioic acid | 934.4 |
| Benzoin | 28.4 |
| Triphenyl tin hydroxide | 28.4 |

[1]The acrylic polymer contains 25% glycidyl methacrylate by weight and has a Tg of 60° C.

The resulting powder was electrostatically sprayed onto grounded, primer coated steel panels. The powder paint coated panels were baked at 275° F. for 45 minutes to form hard glossy coatings. The coating exhibited a large amount of orange peel texture.

EXAMPLE 19

Preparation of Acrylic Coating Containing Crosslinker #1 from Ex. 15.

|  | Weight (Grams) |
|---|---|
| Acrylic polymer[1] | 4464.1 |
| Crosslinker #1 from Ex. #15 | 1195.4 |
| Benzoin | 28.4 |
| Triphenyl tin hydroxide | 56.8 |

[1]The acrylic polymer contains 25% glycidyl methacrylate by weight and has a Tg of 60° C.

The resulting powder was electrostatically sprayed onto grounded, primered steel panels. The coated panels were baked at 275° F. for 45 minutes to form hard glossy coatings. The panels exhibited negligible orange peel textured appearance.

Although specific examples illustrate the various merits of the invention, the scope of the invention is not intended to be limited except by the appended claims.

We claim:

1. A powder paint coating composition containing a thermosetting polymeric binder adapted to coreact upon heating, the polymeric binder comprising on a weight basis:
   between 60% and 95% glycidyl functional acrylic copolymer produced by non-aqueous addition copolymerization of ethylenically unsaturated monomers including about 10% to 50% glycidyl monomer, said copolymer having a number average molecular weight between 1,000 and 20,000; and
   between 5% and 40% of a crystalline polyester-urethane crosslinker comprising a mixture of free unreacted dodecanedioic acid and polyester-urethane oligomer having a number average molecular weight between about 250 and 1,000, said crystalline polyester-urethane crosslinker produced by esterifying excess equivalents of dodecanedioic acid with urethane diol to produce said crystalline polyester-urethane crosslinker comprising at least 45% by weight of unreacted dodecanedioic acid, wherein said polyester-urethane oligomer comprises five or less coreacted units of said dodecanedioic acid and said urethane diol.

2. The powder coating of claim 1 where the urethane diol is produced by reacting an even number carbon atoms lower alkanol amine with ethylene carbonate.

3. The powder coating of claim 2 where the lower alkanol amine is ethanol diamine.

4. The powder coating of claim 1 where the crystalline polyester-urethane crosslinker comprises at least about 85% by weight unreacted dodecanedioic acid plus dodecanedioic acid functional polyester-urethane oligomer coating five or less coreactive units of said dodecanedioic acid and said urethane diol.

5. The powder coating of claim 4 where the crystalline Polyester-urethane crosslinker comprises the reaction product of dodecanedioic acid and 2-hydroxyethyl urethane of ethanol.

6. The powder coating of claim 1 where the crystalline polyester-urethane crosslinker comprises the reaction product of said dodecanedioic acid and said urethane diol on an equivalent ratio between about 3:1 and 6:1.

* * * * *